Oct. 17, 1961  J. R. URSCHEL ET AL  3,004,572
MACHINE FOR SLICING A FOOD PRODUCT
Filed July 22, 1957  5 Sheets-Sheet 1

INVENTORS
JOE R. URSCHEL
BY GERALD W. URSCHEL
Charles S. Penfold
ATTORNEY

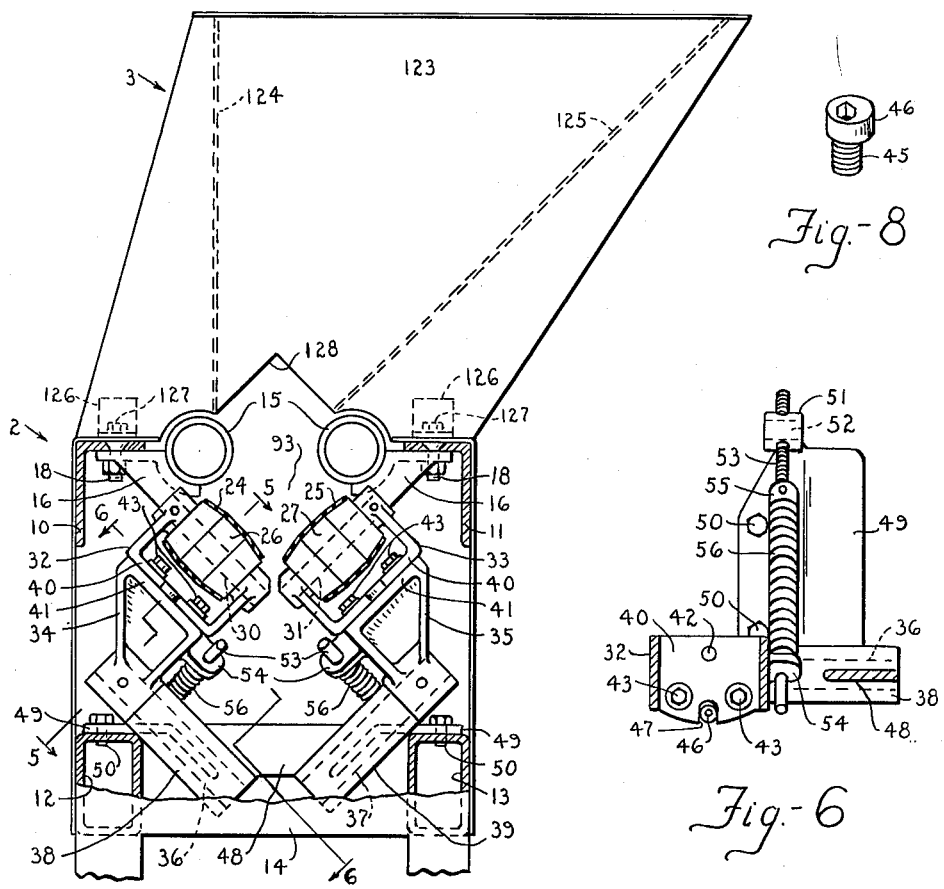
Fig.-8
Fig.-6
Fig.-4
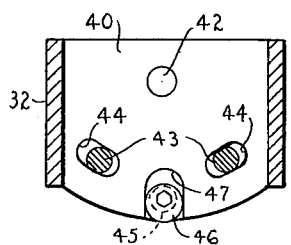
Fig.-7
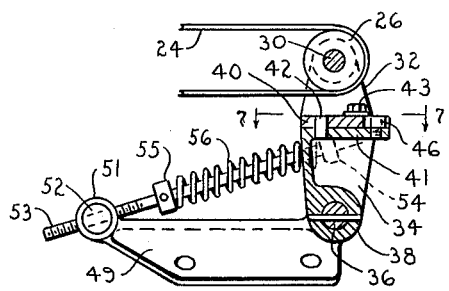
Fig.-5
INVENTORS
JOE R. URSCHEL
BY GERALD W. URSCHEL
Charles S. Penfold
ATTORNEY Oct. 17, 1961  J. R. URSCHEL ET AL  3,004,572
MACHINE FOR SLICING A FOOD PRODUCT
Filed July 22, 1957  5 Sheets-Sheet 3
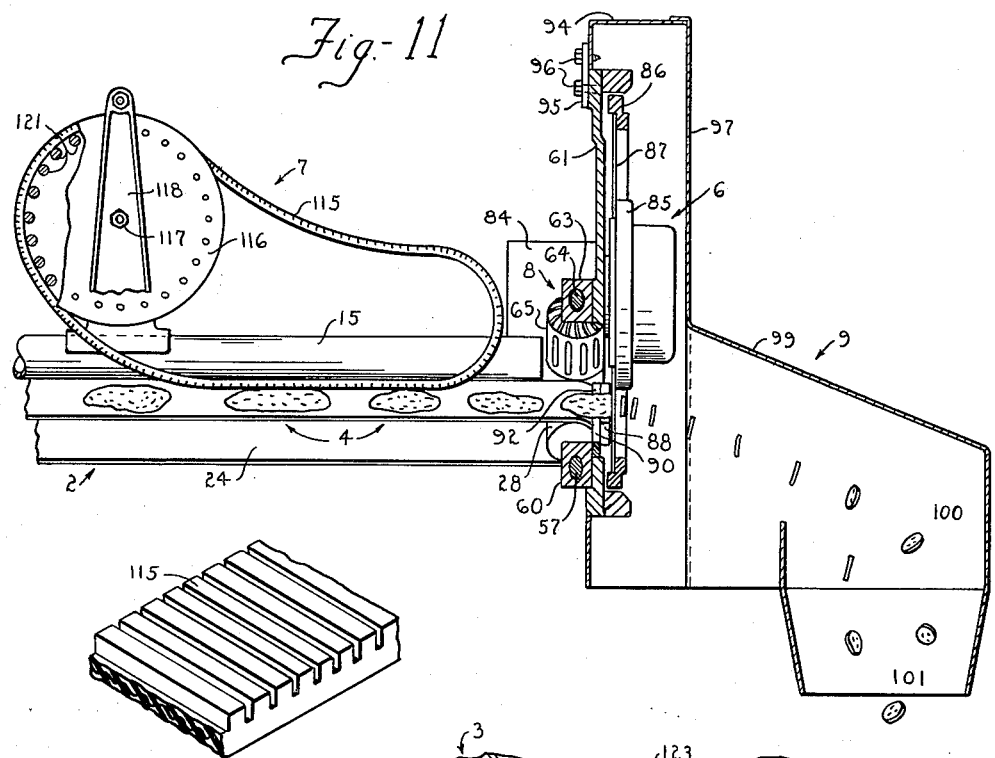
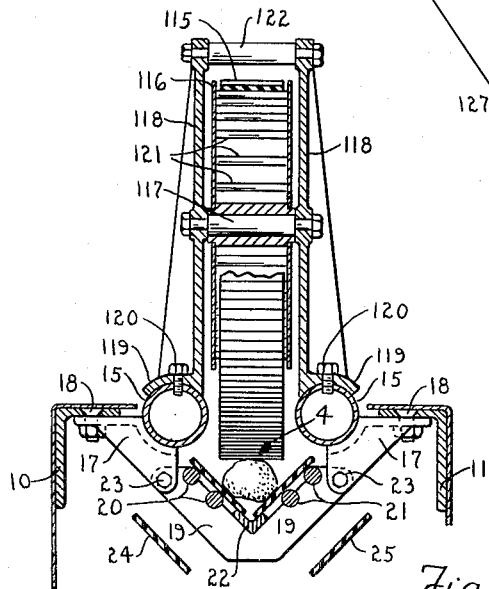
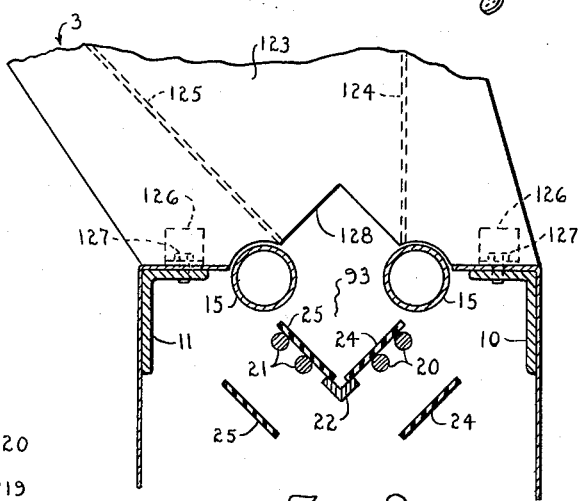
INVENTORS
JOE R. URSCHEL
GERALD W. URSCHEL
BY Charles J. Penfold
ATTORNEY

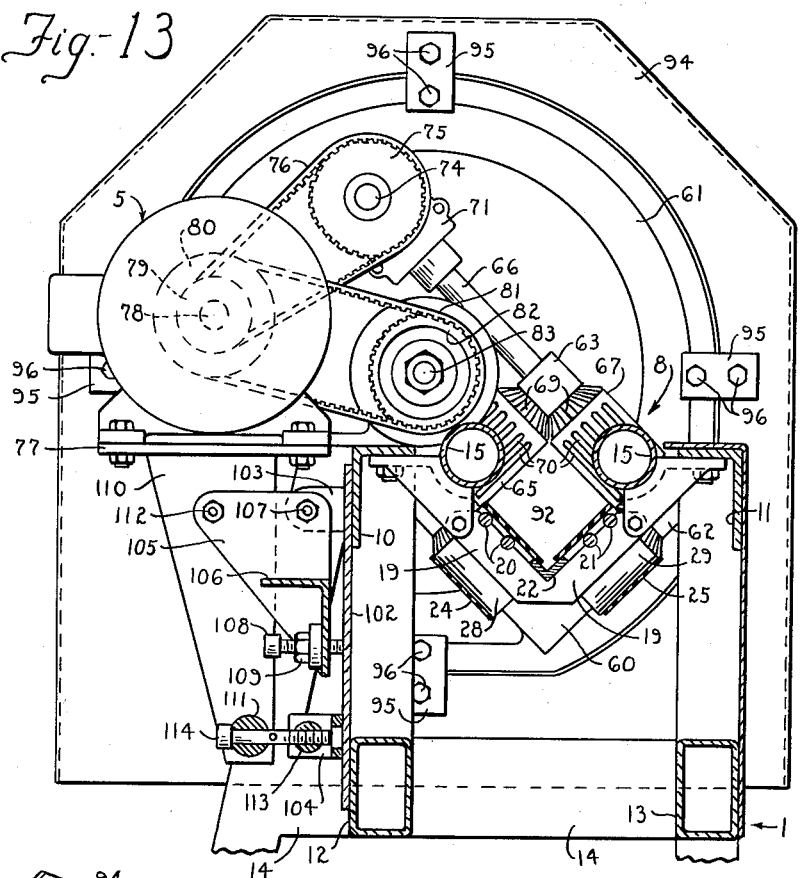

Oct. 17, 1961  J. R. URSCHEL ET AL  3,004,572
MACHINE FOR SLICING A FOOD PRODUCT
Filed July 22, 1957  5 Sheets-Sheet 5

INVENTORS
JOE R URSCHEL
BY GERALD W. URSCHEL
Charles S. Penfold
ATTORNEY

United States Patent Office 3,004,572
Patented Oct. 17, 1961

3,004,572
MACHINE FOR SLICING A FOOD PRODUCT
Joe R. Urschel, 202 Michigan Ave., and Gerald W. Urschel, 1614 Napoleon, both of Valparaiso, Ind.
Filed July 22, 1957, Ser. No. 673,477
22 Claims. (Cl. 146—109)

The invention relates generally to means for conditioning a food product and more particularly is directed to a machine for cutting a product into pieces or slices for consumption.

The machine embodying the invention or inventions may be used wherever applicable but has been primarily designed and constructed for severing into slices a plurality of different kinds of vegetables or fruits, such as cucumbers, whether fresh or processed, carrots, celery, rhubarb, broccoli, lemons and oranges, okra, crooked neck squash, bamboo shoots, water chestnuts, cabbage and lettuce. To cut certain of these products, for example, large bunches of celery or squash, it may be necessary to first split same or if the product, for example, is an orange, lemon, cabbage and lettuce, it is first cut into chunks or pieces more or less of predetermined sizes prior to delivery into the machine. The machine is also suitable for cutting certain meat products, such as slabs of pork belly or fat back, with or without the rind, into pieces of uniform weight.

Many of the machines now in commercial use for the above purpose are comprised of a multitude of complicated or intricate components which offer difficulties with respect to manufacture and assembly and require constant care and maintenance and at best, do not produce an efficient cutting job. Also, some machines are so constructed that only one product can be severed, while others are of such a character that the capacity for cutting is so limited that the cost and use thereof may not be justified. Moreover, the majority of the machines now in use do not have those attributes whereby the product can be cut into pieces or slices of uniform size or thickness, nor afford a setup whereby slicing can be achieved without breaking, crushing or excessively bruising the product.

With the foregoing in mind, the principal object of the invention is to provide a machine embodying improved principles of design and construction which overcomes all of the disadvantages inherent in the conventional machines above referred to.

An important object of the invention is to provide a machine whereby the product is held in a stable position while being transported by a conveyor assembly to a cutter assembly. More particularly in this regard, the conveyor assembly preferably includes a pair of belts for supporting and conducting a product, and means preferably in the form of a third belt engaged by and actuated by the product and cooperating with the conveyor belts for holding the product in a stabilized condition throughout its travel to the cutter assembly, as distinguished from directing a product along a stationary guide which offers considerable frictional resistance and causes bouncing and bruising of the product.

Another object of the invention is to provide a pair of longitudinal supports which cooperate with the conveyor belts in gauging the size of the products as they are introduced to the conveyor assembly and in guiding the products while they are traveling toward the cutter assembly. The supports are provided with convex or curved surfaces so as to reduce or minimize friction between the supports and products during travel of the latter.

A significant object of the invention is to provide a machine in which the conveyor or feed belts are supported on pulleys in a manner to provide a trough for resiliently supporting the product, including unique means for adjusting the belts and automatically applying or maintaining a proper tension thereon, rack means for stabilizing the belts, and means for driving the belts.

A particular object of the invention is to provide a durable and efficient machine which affords advantages with respect to cutting various products, as above referred to, and in stabilizing the products during their travel toward the cutter assembly.

An important object of the invention is to provide roller means and or pulleys adjacent the discharge end of the conveyor assembly for sizing, confining and/or forcing the product into the cutter assembly.

A further object of the invention is to provide a machine in which a single power unit is operatively connected by belts to the conveyor assembly and cutter assembly, with improved means for adjusting the belts with respect to the assemblies.

Also, an object is to provide a hopper which can be readily detachably connected to the machine in either of two positions so that if desired, the product can be introduced thereto from either side of the machine.

A further object of the invention is to provide a housing for protecting the cutter assembly with a spiral chute on the housing assisting to reduce the speed of the cut product and thereby prevent breakage thereof.

A specific object of the invention is to provide a novel process for conditioning a food product, which comprises resiliently supporting and conveying a product and stabilizing its position while conveyed.

Other objects and advantages of the invention will become apparent after the description hereinafter set forth is considered in conjunction with the drawings annexed hereto.

In the drawings wherein a preferred embodiment of the invention is disclosed:

FIGURE 4 is an enlarged transverse sectional view taken substantially on line 4—4 of FIGURE 2;

FIGURE 5 is a transverse sectional view taken substantially on line 5—5 of FIGURE 4, illustrating, among other things, the structural characteristics of the means used to adjust the tension of the conveyor belts;

FIGURE 6 is a transverse section taken substantially on line 6—6 of FIGURE 4 illustrating other details of the tension adjusting means;

FIGURE 7 is a transverse section taken substantially on line 7—7 of FIGURE 5 exemplifying additional details;

FIGURE 8 is a pictorial view of one of the screws employed in the tension adjusting means;

FIGURE 9 is an enlarged transverse section taken substantially on line 9—9 of FIGURE 2 and depicts certain details of the conveyor assembly and the hopper mounted on the frame of the machine;

FIGURE 10 is an enlarged transverse section taken substantially on line 10—10 of FIGURE 2 for the purpose of illustrating the stabilizer and mode of mounting same for cooperation with the conveyor assembly;

FIGURE 11 is an enlarged transverse section taken substantially on line 11—11 of FIGURE 1 illustrating the relationship of the conveyor belts and stabilizer, the relationship of the cutter assembly to the conveyor assembly, and a housing disposed about the cutter assembly;

FIGURE 12 is a partial perspective view of a belt constituting a component of the stabilizer assembly;

FIGURE 13 is an enlarged transverse section taken substantially on line 13—13 of FIGURE 1 and illustrates the operative relationship of the motor or driving means and the conveyor assembly;

FIGURE 14 is a transverse section taken through an appropriate part of the machine for the purpose of further illustrating the operative relationship of the motor and conveyor assembly;

Figure 1:
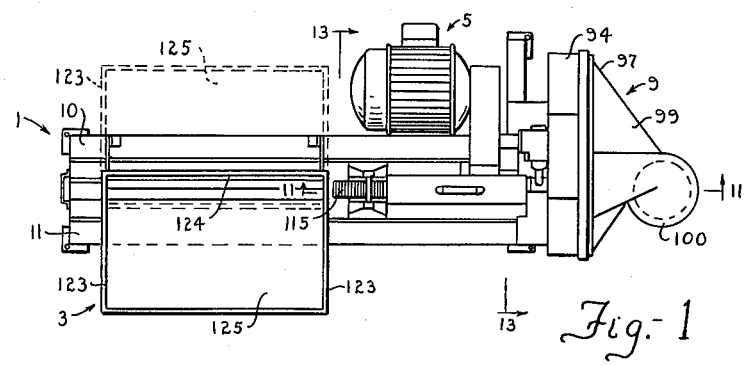
FIGURE 1 is a top plan view of the machine.
Figure 2:
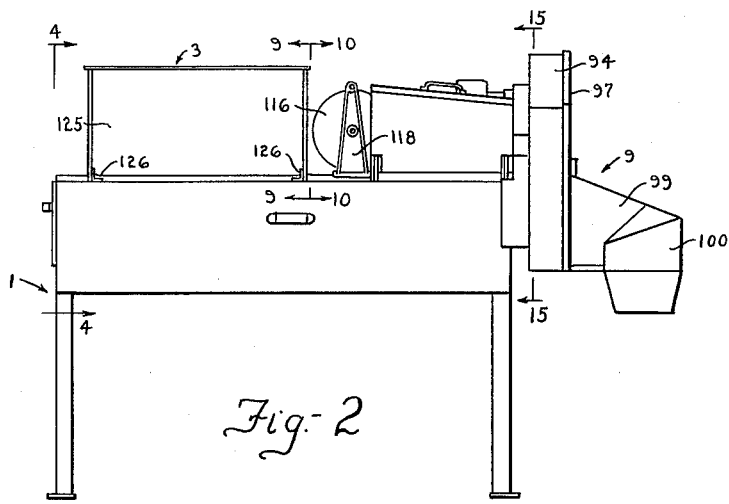
FIGURE 2 is a side elevation of the machine depicted in FIGURE 1.

The machine, as exemplified in FIGURES 1, 2 and 11 of the drawing, comprises, among other things, an elongated upstanding frame generally designated 1, conveyor means 2 supported longitudinally on the frame, a hopper 3 mounted on the frame at the receiving end of the conveyor means 2 for directing products, such as 4, onto the conveyor means, driving means 5 for operating the conveyor means to cause it to deliver the products to a cutter assembly 6 at the discharge extremity of the conveyor means, means 7 disposed above and cooperating with the conveyor means for stabilizing the travel or motion of the products as they approach the cutter assembly, means 8 located at the discharge end of the conveyor means and cooperating therewith for guiding or controlling the products as they are being cut, and a chute 9 for receiving and directing the cut products into a container or receptacle (not shown).

Figure 3:
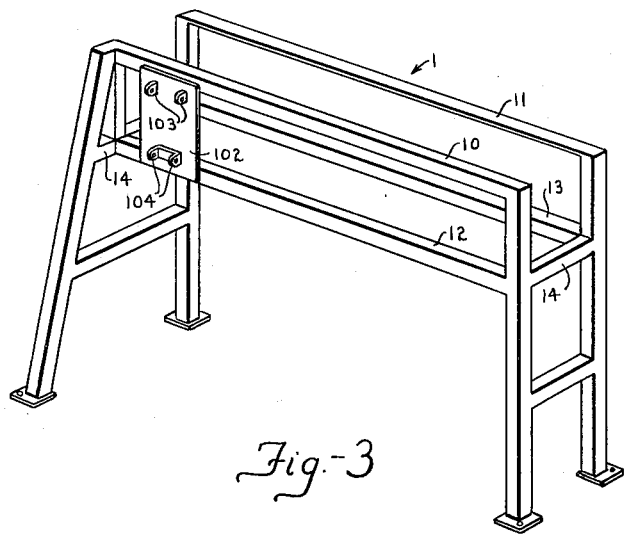
FIGURE 3 is a perspective view of the frame on which the operative components are mounted.

The frame 1, as best depicted in FIGURE 3, includes, among other things, a pair of upper rails 10 and 11, a lower pair of rails 12 and 13, and a pair of end rails 14 disposed substantially on the same level as the lower pair of rails.

The conveyor means 2 and the structure supporting it is unique and embodies improved principles of design and construction. The supporting means may be designed and constructed in various ways but as most clearly shown in FIGURES 4, 10, 11 and 13, it includes a pair of elongated tubular supports 15 secured in parallel relation to and between the upper rails 10 and 11 by longitudinally spaced pairs of brackets. One pair of brackets 16 is located adjacent the receiving end of the machine, as shown in FIGURE 4, a second pair 17 intermediate the ends of the machine as shown in FIGURE 10, and a third pair, shown at the discharge end of the machine, as viewed in FIGURE 13. The supports are preferably cylindrical and detachably secured to the brackets and the latter are preferably detachably secured to the top rails 10 and 11 by suitable fasteners such as bolts 18.

A rack or framework, constituting a subassembly of the conveyor supporting means, is attached to the three pairs of brackets below the supports 15 and includes a plurality of hangers having angularly disposed portions 19, which hangers are joined together in vertical relation by pairs of horizontally disposed longitudinal cylindrical rods 20 and 21 respectively secured to said portions and a center V-formation 22, all of which generally define a V-shaped guide. The upper ends of the hangers are preferably detachably connected to the brackets by suitable fastening means, such as bolts 23 to locate and center the rack below the supports 15 so that the inclined sides of the rack will respectively support and stabilize a pair of corresponding conveyor belts 24 and 25 as evidenced in FIGURES 9 and 10. The belts are respectively mounted on a pair of idling pulleys or rollers 26 and 27 at the receiving end of the machine and by a pair of driven pulleys, rollers or gears 28 and 29 at the discharge end of the machine as respectively depicted in FIGURES 4 and 14.

The pulleys 26 and 27 are mounted in a novel way for adjusting the tension of the conveyor belts and the driven pulleys 28 and 29 are mounted and operatively connected to the driving means 5 in a unique manner and will now be described. The pulleys 26 and 27 are respectively rotatably mounted on axles 30 and 31 carried by arms on a pair of members 32 and 33 adjustably secured to a pair of mountings 34 and 35, which in turn are respectively provided with shafts 36 and 37 journalled in tubular bearings 38 and 39 anchored to the lower rails 12 and 13 of the frame 1. The axles 30 and 31 are preferably disposed substantially at right angles to correspond with the angular relationship of the sides of the rack and the pulleys 26 and 27 are preferably provided with cylindrical and frusto-conical ends so as to assist in centering the belts on these pulleys as well as on the pulleys 28 and 29. Each of the members 32 and 33 includes the arms above referred to and a base wall 40, the latter of which is pivotally connected to a base 41 of each of the mountings 34 and 35 by a pivot pin 42 as shown in FIGURES 4 through 7. A pair of bolts 43 extend through round holes provided therefor in each base 41 and through converging arcuate slots 44 provided in each base wall 40 and a screw 45 is carried by each base and provided with an eccentric 46, which extends into a notch 47 provided in each base wall as shown in FIGURE 7. Thus, each of the members 32 and 33 can be readily adjusted on the base of its mounting by merely loosening the bolts 43 and manipulating the screw 45 to pivot the member through the agency of the eccentric 46 and then locking the member in place by the bolts so that the belts can be properly aligned or centered on the pulleys.

The tubular bearings 38 and 39 are preferably joined together at right angles by a bridge 48 to impart strength and rigidity to the bearings and include integral offsets 49 extending from the bearings which are preferably detachably anchored to the lower rails 12 and 13 of the frame by screws 50 as depicted in FIGURE 4. Each of the offsets is preferably provided with a tubular formation 51 adjacent one end within which is mounted a rotatable nut 52. A shaft 53 has a threaded end extending through the nut and clearance slots provided in the formation 51 and its opposite end extends through an aperture provided in an ear 54 formed on each mounting as depicted in FIGURES 4, 5 and 6. A collar 55 is keyed to each of the shafts 53 and a helical spring 56 about each shaft so that the ends of each spring will bear against a collar and an ear to normally urge a mounting and a member as a unit in a direction toward the right as viewed in FIGURE 5 and thereby maintain the belts under proper tension, which can be readily obtained by merely screwing and unscrewing the shafts 53 with respect to the nuts 52. Attention is directed to the fact that since the conveyor or feed belts 24 and 25 are in effect mounted on floating pulleys at the receiving end of the machine, the belts will generally automatically adjust themselves to the four pulleys on which they are supported, after they have once been adjusted for use by selective manipulation of the screws 45 and the shafts 53.

The conveyor belts are preferably driven by the pulleys or gears 28 and 29 as alluded to above and may be operated in different ways but as illustrated, the pulleys are preferably respectively rotatably mounted on axles 57 and 58 as viewed in FIGURE 14. The axle 57 is preferably secured to a pair of lugs 59 and 60 detachably secured to a large cast mounting head 61 and the axle 58 to a lug 62 and to the lug 60 which affords a common support for ends of both axles. The head is also provided with a fourth lug 63 which with lug 59 jointly carries an axle 64 which rotatably supports a roller 65 and the lugs 62 and 63 jointly carry an elongated driven shaft 66 having a roller 67 keyed for rotation therewith. The pulleys 28 and 29 and the roller 65 are preferably mounted on ring bearings 68 surrounding the axles 57, 58 and 64 and ring bearings are also provided for the shaft 66. The ends of the roller 67 on the elongated shaft 66 are provided with gear teeth 69 which respectively mesh with teeth on one end of the roller 65 and teeth on one end of the adjacent pulley 29 and the opposite end of the roller 65 is provided with teeth which mesh with teeth on one end of the pulley 28. Thus, rotation of the shaft 66 will cause the roller 67 thereon to simultaneously rotate the roller 65 and the pulley 29 opposite one another and rotation of the other pulley 38 through roller 65, to effect simultaneous rotation of the pulleys and rollers to cause the pulleys to rotate the conveyor or feed belts 24 and 25 and particularly direct the upper lengths or portions thereof toward the cutter assembly 6 and so that these upper portions in combination with the pulleys 28 and 29 and rollers 65 and 67 will constitute the guiding or controlling means 8, above referred to, for the products 4 at the discharge end of the conveyor means.

Attention is directed to the fact that the exterior surfaces of the driven pulleys 28 and 29 are preferably roughened or knurled so as to reduce slippage of the belts with respect thereto and that the exterior surfaces of the rollers 65 and 67 are preferably serrated, grooved, corrugated or fluted longitudinally as indicated at 70 for the purpose of sizing and/or assisting in forcing products axially away from the conveyor assembly for cutting by the cutter assembly, depending on the cross-sectional dimension of the product to be cut.

The mounting head 61 which carries the pulleys 28 and 29 and rollers 65 and 67 is firmly detachably connected in a vertical position to the frame 1 by suitable means including a bracket. The rear side of the head is provided with a gear housing 71 as shown in FIGURES 13 and 14, and one end of the driven shaft 66 is journalled in this housing and provided with a bevel gear 72 which meshes with a gear 73 carried by a shaft 74 disposed at right angles to the shaft 66. Suitable bearings are provided in the housing for the shafts. The shaft 74 is provided with a pulley or wheel 75 for engagement with a belt 76.

The driving means 5 for the conveyor assembly and cutter assembly may be designed and constructed in different ways but as exemplified in the drawings, it is preferably in the form of an electric motor which is mounted on a platform 77 for adjustment in a novel manner which will be described more in detail subsequently. The motor has a drive shaft 78 provided with a small pulley or wheel 79 which is operatively connected to the pulley 75 by the belt 76 and a larger pulley or wheel 80 which is operatively connected by a belt 81 to a pulley or wheel 82 carried by a driven shaft 83 of the cutter assembly. The shaft 83 is suitably journalled in ball bearing assemblies mounted in a cylindrical support 84 extending rearwardly from the mounting plate 61. The pulleys or wheels just referred to are preferably provided with teeth and the belts, which may be referred to as chain belts, are provided with teeth which cooperate with the teeth on the pulleys to provide efficient driving connections to counteract slippage. The teeth in the belts are preferably formed by providing transverse notches or grooves in their inner surfaces for receiving the teeth on the pulleys. More particularly, the product is conveyed at a speed which is synchronized with the cutting rate of the cutter head, the rate of the latter being determined by the pitch of the cutting knives.

The cutter assembly 6 mounted on the shaft 83, which will now be described, preferably includes a hub 85 and an annulus, rim or felly 86 which are connected together in concentric relationship by a plurality of corresponding radially extending cutters or knives 87. The knives serve as spokes of a wheel and support the annulus and are very thin and are under several hundred pounds tension. The knives are preferably positioned at a predetermined pitch or angle and twisted to provide a uniform pitch from the hub to the annulus in order to obtain a shearing cut through the product to be cut or severed and for directing the sliced product away from the assembly into the chute 9. The pitch of the knives determines the thickness of the slices and maintains the speed of the product while it is being sliced. The cutter assembly is rotated at a high rate of speed so that the knives will produce clean slices, one at a time, and prevent crushing of the product even when the knives become dull. The knives are located relatively close to a blade 88 detachably secured in a fixed position by screws 89 to one side of a V-shaped support 90 which in turn is detachably connected in a fixed position by screws 91 to the front side of the mounting head 61 in close relationship to a generally square or rectangular opening 92 provided in the head. This opening is substantially axially aligned with a passage 93 defined by the upper portions of the conveyor belts 24 and 25 and the longitudinal supports 15 and the opening defined by the control 8 as best viewed in FIGURES 4, 9, 11 and 16. The product is adapted for travel on the belts and between the pulleys 28 and 29 and rollers 65 and 67 which cooperate to control, guide, support or size a product, depending on its character or kind, through the opening 92 in the head and ride or slide over the V-shaped support 90, including the blade 88 fixed thereon, where it is expeditiously and efficiently cut or severed by the knives. The operative relationship of the conveyor assembly and cutter assembly is so synchronized or organized that the product will be rapidly cut and thrown away from the knives into the housing where they find their way into the chute. In other words, the capacity of the cutter assembly to cut a product is sufficient to take or receive any quantity of the product fed thereto by the conveyor assembly. Of further importance is the fact that the cutter assembly can be readily detached for repairs or replacement by a new one of like kind or others having knives which will cut slices of different thicknesses.

Figure 15:
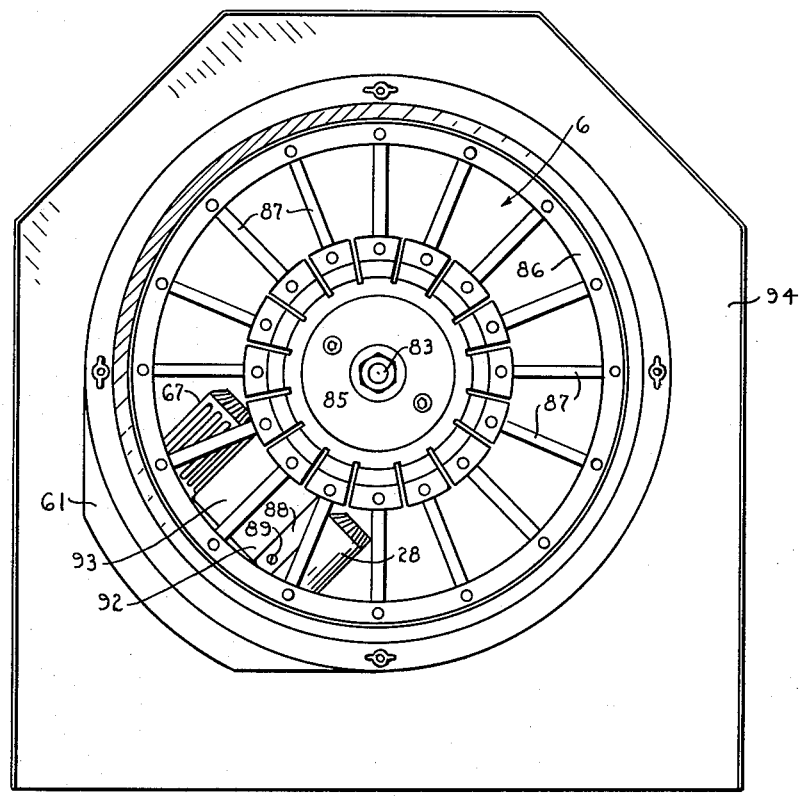
FIGURE 15 is an enlarged section taken substantially on line 15—15 of FIGURE 2 showing structural characteristics of the housing mounted about the cutter assembly.
Figure 16:
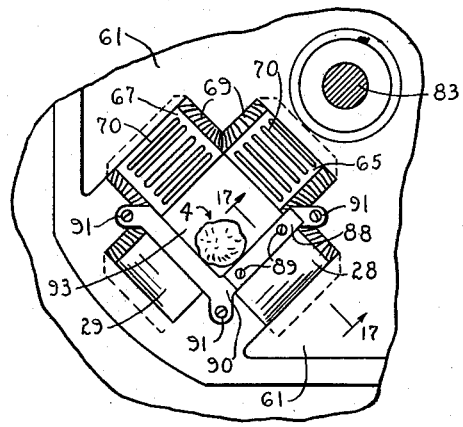
FIGURE 16 is a partial elevational view, with portions in section, showing the operative relationship of a stationary blade with a part of the conveyor assembly.
Figure 17:
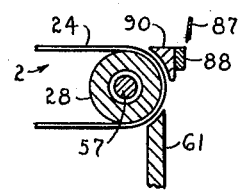
FIGURE 17 is a partial transverse section taken substantially on line 17—17 of FIGURE 16 showing the operative relationship of a knife of the cutter assembly and the stationary blade.

The cutter assembly is preferably protected by a relatively large fabricated sheet metal housing having a back structure 94 provided with a vertical back wall having an opening therein which receives the mounting head 61 as depicted in FIGURES 11 and 15. This back structure is detachably connected to the mounting head 61 by a plurality of fittings 95 and bolts 96 with the side walls of the structure disposed about the head and cutter assembly. The housing also includes a cover 97 suitably detachably connected to the back structure 94. This cover includes a tapered portion 99 disposed in front of the opening in the head for receiving the cut product and a vertical tubular cylindrical funnel or spiral portion 100 having an outlet opening 101 through which the cut product may fall into a suitable container or receptacle (not shown). Attention is directed to the fact that the longitudinal passage 93 is preferably disposed substantially tangent to the spiral portion 100 so that as the cut product or slices are projected into space from the cutter assembly they will be more or less directed against the wall of the spiral portion to cause the slices to rotate or follow its curvature to reduce their speed prior to passing through the outlet opening. In this way, breakage of the slices is eliminated or reduced to a minimum.

The driving means or motor 5 as alluded to above is mounted on the platform 77 for adjustment in a novel manner. More particularly in this regard, a relatively heavy mounting plate 102 is affixed in a vertical position to the rails 10 and 12 of the frame 1 as depicted in FIGURES 3 and 13. This plate is provided with an upper pair of apertured ears 103 and a lower bracket having apertured ears 104. An adjustable unit is operatively connected to the platform structure and the mounting plate and preferably includes a pair of vertical walls 105

(only one is shown) and an elongated horizontal bridge 106 joining the walls. A bolt 107 or equivalent means extends through the vertical walls and the upper ears 103 on the mounting plate for pivotally connecting the unit to the plate and a screw 108 is carried by the bridge for engaging the plate. The screw may be manipulated to vary the pivotal relationship of the unit with respect to the plate to raise or lower the platform and motor thereon and thereby afford a setup for equalizing the tension on the drive belts 76 and 81. A nut 109 on the screw is provided for locking the screw in place after adjustment.

The platform 77 which carries the motor is provided with a pair of corresponding depending legs 110 (only one is shown) which are joined together at their lower ends by an elongated horizontal rotatable rod 111. A bolt 112 or equivalent means extends through the legs 110 and the side walls 105 of the unit for pivotally connecting the platform thereto. An elongated rod 113 is rotatably mounted on the pair of ears 104 on the bracket and a screw 114 is operatively connected to these rods in a manner whereby the platform and motor thereon may be pivotally adjusted with respect to the unit about the axis of the bolt 112 to obtain the desired tension on the drive belts and thereby in combination with the equalizing adjustment provide efficient driving connections between the motor, cutter assembly and the means operatively connected to the motor for driving the conveyor belts.

The stabilizing means 7, above referred to, for controlling the motions of the products during their travel to the cutter assembly is unique and will now be described. This means may be designed and constructed as desired, but as disclosed in FIGURES 1, 2, 10, 11 and 12, includes a relatively heavy rotatable member or rubber belt 115 carried by a support preferably in the form of a drum or wheel 116 and is disposed to freely engage and stabilize the motions of the products during their travel on the conveyor belts while the products impart rotation to the stabilizer belt. The wheel is preferably mounted on an axle 117 carried by a pair of corresponding standards 118 which are respectively detachably connected to the longitudinal supports 15 by providing the standards with channel portions 119 which rest on the supports and screws 120 which extend through the channel portions into threaded apertures in the supports as evidenced in FIGURE 10. The drum is preferably provided with a ring of cross-members 121 which support the stabilizer belt during its rotary movement when the drum is rotated by the belt engaging the moving products or conveyor belts. A cylindrical abutment 122 is supported on the upper ends of the standards 118 above the drum and may be engaged by the belt 115 to assist in holding it operatively connected to the drum. The outer side of the belt is preferably provided with a plurality of cross-slots or grooves to impart greater flexibility to the belt so that it will more or less readily adjust or conform itself to the shape of the product being conveyed and thereby afford an improved control over the products to stabilize or reduce to a minimum their individual movement on the conveyor belts. The grooves also serve in providing the exterior surface of the belt with a plurality of spaced resiliently flexible abutments which engage the product at a plurality of longitudinally spaced locations to improve the stabilization factor.

In view of the foregoing, it will be manifest that the products after falling onto the conveyor belts are carried for a predetermined distance and then subjected to the stabilizing influence of the overhead stabilizer belt so that these three belts, which define a passage substantially triangular in cross-section, jointly cooperate to resiliently support and carry the products for a distance in a manner to prevent or reduce rocking or wobbling thereof after which the pulleys 24 and 25 and the rollers 65 and 67, above referred to, then take over and serve to further guide and control the products as they pass into the opening 92 in the head plate over the blade 88 for cutting by the knives 87 on the cutter assembly. The products are substantially confined or enclosed during their travel between the three belts. The rollers 65 and 67 having the corrugations thereon assist in positively feeding the product to the cutter assembly, and when a bushy product, such as celery, is conducted by the belts, the rollers serve to compact or size the product. The belts support the full weight of the product so the product will not be interrupted or bruised in its uniform rate of travel by contact with any stationary surfaces of appreciable length or obstructions. When the machine is empty the stabilizer belt rests upon the conveyor belts but when a product is travelling therethrough the stabilizer belt engages the product and stops all bouncing, wobbling or turning thereof on the conveyor belts. As the weight of the free trailing portion of the stabilizer belt is on the product to resiliently press it against the conveyor belts, the product is quickly brought up to the proper feeding speed toward the cutter assembly. Also, due to the fact that the stabilizer belt is driven by either or both of the conveyor belts when the machine is empty, the stabilizer belt is always in synchronous speed which quickly stops all rolling of the product on the conveyor belts. The three belts thus serve to more or less resiliently clamp each product at at least three generally circumferentially spaced locations during its travel between the belts which rotate at substantially the same speed.

The machine or apparatus is preferably provided with the hopper 3 to facilitate uniform feeding of the products onto the conveyor belts to promote the cutting capacity, but if desired, the hopper can be removed so the products can be manually placed on the belts. The hopper may be constructed in different ways but as exemplified in FIGURES 1, 2, 4 and 9, preferably includes an inclined pair of vertical end walls 123 and a pair of converging side walls 124 and 125. The end walls of the hopper are preferably provided with inturned lugs 126 through which screws 127 are inserted for connection with threaded apertures in the upper rails 10 and 11 of the frame 1. The setup is such that the hopper can be attached to the frame in either of two positions as depicted in FIGURE 1, so that the products to be cut can be readily introduced into the hopper from either side of the machine as desired. It will be noted that the hopper is more or less mounted in an inclined position with a portion thereof overhanging a side of the machine. It will also be noted that the side wall 124 of the hopper is preferably disposed in a substantially vertical position whereas the other side wall 125 is disposed at an angle thereto so these walls will cooperate with the end walls to provide a trough to direct the products onto the conveyor belts. Attention is directed to the fact that the lower extremities of the end walls are preferably provided with openings 128 either of which affords clearance for passage of the products, depending on the position of the hopper on the frame. The lower marginal edges of the hopper walls define an outlet having a width which is somewhat greater than the distance or space between the longitudinal supports 15 and in combination with the latter form a passage or throat through which the products pass onto the conveyor belts. The distance between the upper portion of each conveyor belt and support 15 directly opposite thereto is preferably predetermined to substantially correspond to the distance between the supports to promote the aforesaid gauging and uniform flow or travel of the products onto the conveyor belts. In practice, the supports are spaced apart 2¾" so that a product less than this in cross-dimension can be dropped or forced therebetween. Attention is directed to the fact that the supports cooperate with the belts in guiding the product toward the cutter assembly and that any contact or engagement of the product with the supports is appreciably minimized due to the curved or convex surfaces of the supports. Also, that the supports, due to their shape, assist in guiding or piloting the products onto the conveyor belts. The products are preferably graded as to size prior to introduction to the machine so that the possibility of jamming on the supports and in the hopper is prevented. Of further importance is the fact that the pulleys 28 and 29 and the rollers 65 and 67 of the conveyor assembly are operatively connected at elevated locations whereby sand or any foreign matter carried along with the product will not interfere with the operation of these pulleys and rollers. In other words, in order to assist in preventing such interference the lower ends of the pulleys are not connected by any gearing, which gearing, if used, would soon become damaged by sand, grit or other foreign matter travelling on the belts.

Having thus described our invention it is obvious that various modifications may be made in the same without departing from the spirit of the invention, and, therefore, we do not wish to be understood as limiting ourselves to the exact form, construction, arrangement, and combination of parts herein shown and described.

We claim:

1. An assembly for conveying a product, said assembly comprising pulleys adapted to be mounted for rotation, belt means carried by the pulleys for supporting and carrying the product, a drum or cylindrical member adapted to be mounted above the belt means, and an endless belt embracing the drum or cylindrical member and having a trailing portion extending lengthwise of the belt means for loose engagement and actuation by a product for stabilizing its position when carried by the belt means or for loose engagement and actuation by the belt means when the latter is free of the product.

2. A conveyor assembly for conducting a food product to a cutter assembly, said conveyor assembly comprising a frame, two pairs of pulleys mounted on the frame, a resilient conveyor belt carried by each pair of pulleys, means for driving at least one pulley of each pair to rotate the belts, the axes of said pulleys being angularly disposed so that the upper portions of the belts define a trough for resiliently supporting and carrying the product, a drum or cylindrical member mounted on the frame above the conveyor belts, and an endless belt surrounding the drum or cylindrical member and having a trailing portion for loose engagement and rotation by the product for holding and stabilizing its position while carried by the belts.

3. A conveyor assembly for conducting a product to a cutter assembly, said conveyor assembly comprising a frame, two pairs of pulleys mounted on the frame, a resilient conveyor belt carried by each pair of pulleys, means for driving at least one pulley of each pair to rotate the belts, the axes of said pulleys being angularly disposed so that the upper portions of the belts define a trough for resiliently supporting and carrying the product, an idling drum mounted on the frame above the belts, and an endless belt mounted on the drum and having a trailing portion overlying the conveyor belts for loose engagement and rotation by the product for holding and stabilizing its position while carried by the conveyor belts and for engagement and rotation by the latter when free of the product.

4. An assembly for conveying a product, said assembly comprising pulleys adapted to be mounted on a support, belt means carried by the pulleys for supporting and carrying the product, an idling drum adapted to be mounted above the belt means, and an elongated endless belt of appreciable size carried by and surrounding the drum and having a trailing portion extending lengthwise of the belt means for loose engagement and actuation by the product for stabilizing the position of the product while being carried by the belt means or for loose engagement and actuation by the latter when free of a product.

5. A machine of the kind described comprising an elongated frame, a cutter assembly adjacent one end of the frame, a conveyor mounted on the frame for conducting a product to the cutter assembly for severance into pieces, a hopper attachable to the opposite end of the frame in either of two positions so that the product may be placed in the hopper from either side of the machine for disposition on the conveyor, power means for simultaneously operating the cutter assembly and conveyor, and a housing arranged about the cutter assembly provided with a depending chute structurally related to the cutter assembly in a manner whereby the pieces after being cut will be directed against the chute to impart a rotary motion thereto and thereby reduce their speed prior to discharge from the chute.

6. An assembly for conveying a food product, said assembly comprising pulleys adapted to be mounted on a support, belt means carried by the pulleys for supporting and carrying the product, an idling drum mounted above the belt means, and an endless belt of appreciable size carried by the drum and having a trailing portion extending lengthwise of the belt means for loose engagement and actuation by the belt means or for loose engagement and actuation by the product after the belt approaches or substantially attains the speed of the belt means for stabilizing the position of the product when carried by the belt means and belt.

7. A machine for cutting a product into slices comprising a frame, a cutter assembly mounted on the frame, and a conveyor assembly mounted on the frame for directing the product to the cutter assembly, said conveyor assembly comprising rotatable supports, a plurality of elongated resilient endless belts mounted on the rotatable supports and having upper portions for resiliently supporting the product during its travel on the belts, elongated stationary rods extending lengthwise of the belts for stabilizing the said upper portions thereof, and means affording adjustment of certain of the supports to automatically maintain a desired tension on the belts.

8. A conveyor assembly for conducting a product, said conveyor assembly comprising a frame, two pairs of pulleys mounted on the frame, a conveyor belt carried by each pair of pulleys, means for driving at least one pulley of each pair to rotate the belts, the axes of said pulleys being angularly disposed so that the upper portions of the belts define a V-shaped trough for supporting and carrying the product, resilient means mounted on the frame above the conveyor belts for engaging and stabilizing the position of the product while carried by the belts, and means for obtaining a desired tension on the belts.

9. A machine for cutting a product into slices comprising a frame, a cutter assembly mounted on the frame, and a conveyor assembly mounted on the frame for directing the product to the cutter assembly, said conveyor assembly comprising two pairs of longitudinally spaced angularly disposed pulleys, a pair of belts respectively mounted on the pairs of pulleys and defining a V-shaped trough for simultaneously supporting and conveying the product to the cutter assembly, a pair of rollers structurally related in spaced relation to certain of the pulleys and the belts and operable in conjunction therewith for positively sizing and/or forcing the product to the cutter assembly, and means for simultaneously imparting rotation to the rollers and said certain pulleys for rotating the belts.

10. A subassembly of a conveyor comprising a frame, a pair of angularly disposed pulleys mounted on the frame for supporting conveyor belts, a support carried by the frame, a pair of angularly disposed rollers mounted on the support in relation to the pulleys to define a substantially square opening through which a product is adapted to be conveyed, a shaft keyed to one of the rollers for rotating same, means directly operatively connecting the rollers, means directly operatively connecting the other roller with one of the pulleys, and means directly operatively connecting the pulleys so that rotation of the shaft will simultaneously rotate the pulleys and rollers.

11. A conveyor assembly comprising a frame, a cutter assembly located adjacent one extremity of the frame, a first pair of pulleys and a second pair of pulleys mounted on the frame in longitudinally spaced relationship with the second pair adjacent the cutter assembly, belts carried by the pulleys and said pulleys being angularly disposed so that the upper portions of the belts define a trough for supporting and conveying a product to the cutter assembly, means for adjusting the first pair of pulleys to tension the belts, a pair of rollers mounted in angularly disposed relationship to the second pair of pulleys to define a substantially square opening through which the product is adapted to pass to the cutter assembly, and means for simultaneously rotating the rollers and pulleys adjacent thereto.

12. The assembly defined in claim 11, including a pair of elongated supports extending longitudinally above and in parallel relation to the belts for gauging the size of the product adapted for travel on the belts.

13. The assembly defined in claim 11, including a pair of elongated supports extending longitudinally above and in spaced parallel relation to the belts for gauging the size of the product adapted for travel on the belts, and in which the supports and the upper portions of the belts define a passage substantially square in cross-section, the cross-sectional size of which is substantially the same as the cross-sectional size of said opening.

14. A feeding assembly for a food product, said assembly comprising an elongate power driven conveyor, and a stabilizing device for the product comprising a freely rotatable drum above said conveyor and an endless belt extending about said drum and having a trailing portion for loose contact with a top portion of said conveyor.

15. A feeding assembly for a food product, said assembly comprising an elongate power driven conveyor, and a stabilizing device for the product comprising a cylindrical member or drum above said conveyor and an endless belt extending about said member or drum and having a trailing portion for loose contact with a top portion of said conveyor.

16. A feeding assembly for a product, said assembly comprising an elongate power driven conveyor, and a stabilizing device for the product comprising a cylindrical member or drum above said conveyor and an endless belt extending about said member or drum and having a trailing portion for loose contact with a top portion of said conveyor or with the product when the latter is being conveyed.

17. The assembly defined in claim 14, in which the drum comprises a pair of sides with cross members extending therebetween for supporting the endless belt.

18. The assembly defined in claim 14 in which the endless belt is relatively thick and provided with external transverse grooves to promote its conformance with the product to be conveyed.

19. The assembly defined in claim 14 in which the endless belt is provided with external resilient abutments which engage and assist in stabilizing the product to be conveyed.

20. The assembly defined in claim 14 in which the stabilizing device is provided with an abutment overlying the endless belt whereby to assist in maintaining the belt in operative relationship to the drum.

21. A feeding assembly for a food product, said assembly comprising a lower pair of elongate power driven endless belts defining a trough-like conveyor, and a stabilizing device for the product comprising a freely rotatable drum above said conveyor and an endless overhead belt extending about said drum and having a trailing portion for loose contact with top portions of said pair of lower belts.

22. A stabilizing device for use with a power driven conveyor mounted on a frame for conveying a product, said device comprising a pair of spaced parallel standards adapted for attachment to the frame, a shaft supported by and transversely of the standards, a drum mounted on the shaft for rotation about the axis of the shaft and having a pair of annular side members, a plurality of cross elements joining said side members and circumferentially arranged in concentric spaced relation to the periphery of said members, a relatively thick endless belt extending about said drum and having a trailing portion for loose contact with a top portion of the conveyor, and said belt being provided with a plurality of external transverse grooves whereby to promote its conformance with the product to be conveyed.

References Cited in the file of this patent

UNITED STATES PATENTS

| | | |
|---|---|---|
| 63,692 | Beardsley | Apr. 9, 1867 |
| 1,108,163 | Frick | Aug. 25, 1914 |
| 1,319,122 | Shelton | Oct. 21, 1919 |
| 1,438,365 | Dick | Dec. 12, 1922 |
| 2,111,189 | MacDonald | Mar. 15, 1938 |
| 2,310,358 | Emmons et al. | Feb. 9, 1943 |
| 2,535,692 | Mollins et al. | Dec. 26, 1950 |
| 2,738,544 | Stevenson et al. | Mar. 20, 1956 |
| 2,763,305 | Scheckler | Sept. 18, 1956 |